United States Patent [19]

Brown et al.

[11] Patent Number: 4,764,280

[45] Date of Patent: Aug. 16, 1988

[54] WATER SOFTENING APPARATUS

[75] Inventors: Keith E. Brown, Solon; Kenneth C. Seufer, Jr.; Jimmy D. Buth, both of Chardon, all of Ohio

[73] Assignee: Kinetico, Inc., Newbury, Ohio

[21] Appl. No.: 828,390

[22] Filed: Feb. 11, 1986

Related U.S. Application Data

[63] Continuation-in-part of Ser. No. 646,953, Sep. 4, 1984, Pat. No. 4,693,814.

[51] Int. Cl.$^4$ ............................................ B01J 49/00
[52] U.S. Cl. ................................... 210/662; 210/672; 210/673; 210/96.1; 210/140; 210/143; 210/191; 521/26
[58] Field of Search ............... 210/670, 672, 673, 678, 210/687, 140, 143, 190, 191, 269, 275, 277, 278, 284, 662, 96.1, 205; 521/26

[56] References Cited

U.S. PATENT DOCUMENTS

| | | | |
|---|---|---|---|
| 2,145,901 | 2/1939 | Shoemaker | 210/23 |
| 2,383,422 | 8/1945 | Singleton | 103/153 |
| 2,902,155 | 9/1959 | Lundeen | 210/105 |
| 3,216,931 | 11/1965 | Dennis et al. | 210/191 |
| 3,382,983 | 5/1968 | Stewart | 210/266 |
| 3,891,552 | 6/1975 | Prior et al. | 210/190 |
| 4,071,446 | 1/1978 | Kunin | 210/32 |
| 4,116,860 | 9/1978 | Kunin | 252/192 |
| 4,196,081 | 4/1980 | Pavia | 210/94 |
| 4,219,413 | 8/1980 | Jackson et al. | 210/96.1 |
| 4,228,000 | 10/1980 | Hoeschler | 210/673 |
| 4,298,025 | 11/1981 | Prior et al. | 210/190 |
| 4,298,468 | 11/1981 | Heskett | 210/136 |
| 4,336,134 | 6/1982 | Prior | 210/127 |
| 4,430,228 | 2/1984 | Paterson | 210/665 |

Primary Examiner—Ivars Cintins
Attorney, Agent, or Firm—Watts, Hoffmann, Fisher & Heinke Co.

[57] ABSTRACT

A water softening apparatus and method for reducing odor in, and improving the taste of, problem water, including a pair of treatment tanks and a control valve assembly for determining which tank is on-line, and which tank is off-line, and for controlling the regeneration of the off-line tank. An exhausted tank is taken off-line and partially regenerated by communicating a regeneration solution from a reservoir to the tank and passing the solution through a resin compartment after which the solution is discharged to drain. After a predetermined quantity of regeneration solution is passed through the tank, the resin compartment is slowly rinsed using treated water from the on-line tank. Prior to fully rinsing the off-line tank, the fluid flow is terminated leaving a diluted regeneration solution in the off-line tank thereby keeping the off-line tank in a "high solids" condition. Just prior to placing the off-line tank, on-line, treated water from the on-line tank is communicated to the off-line tank and passed through the resin compartment at a flow rate higher than the fluid flow rate during the rinsing step such that the off-line tank is fully backwashed prior to being placed on-line. To further inhibit the propagation of taste and odor degrading bacteria, a growth retarding agent is automatically added to the regeneration solution reservoir prior to initiating a regeneration cycle by a pumping arrangement that operates automatically in response to sensing the flow of regeneration solution to the control valve assembly.

13 Claims, 3 Drawing Sheets

WATER SOFTENING APPARATUS

DESCRIPTION

CROSS REFERENCE TO RELATED APPLICATION

This is a continuation-in-part of U.S. application Ser. No. 646,953, filed Sept. 4, 1984, now U.S. Pat. No. 4,693,814.

TECHNICAL FIELD

The present invention relates generally to water treatment apparatus and in particular to a new and improved water softening apparatus and method for reducing odor in, and improving the taste of, problem water.

BACKGROUND ART

Water softeners of the "ion exchange" type typically include a resin tank through which hard water passes to exchange its "hard" ions of calcium and magnesium for "soft" sodium ions from the resin bed. Regeneration of the resin bed is required periodically to remove the accumulation of hard ions and replenish the supply of soft ions. Regeneration is typically effected by flushing a brine solution through the resin bed. A water softener of this type is more fully described in U.S. Pat. No. 3,891,552 issued June 24, 1975 to William Prior and James W. Kewley, entitled CONTROL VALVE FOR WATER SOFTENERS.

Modern water softeners of the type disclosed in U.S. Pat. No. 3,891,552 typically employ a brine tank which includes a reservoir and supply of salt disposed at a level above the bottom of the reservoir. A tube connected to a source of water establishes a path for water to flow to the reservoir. Upon the attainment of a predetermined level in the reservoir, the water reacts with the salt supply to produce a source of brine for regeneration of the resin bed. When regeneration is required, the brine is aspirated through the same tube that supplied water to the reservoir. The amount of water introduced to the brine tank after the regeneration cycle and the amount of brine aspirated from the tank during a regeneration cycle is controlled by a brine valve mechanism.

Commercially available water softeners generally include one or two tanks which contain the softening chemicals that form the resin beds. In a two tank water softener, one tank is regenerated and kept "off-line" while the other tank is "on-line". A control valve controls the communication of the tanks with the household water supply and controls the timing and sequence of regeneration. An example of such a control valve is disclosed in U.S. Pat. No. 3,891,552. An improved control valve is described in U.S. Pat. No. 4,298,025. Both of these patents are owned by the present assignee and are herein incorporated by reference.

A prior art resin tank typically comprises an elongate cylinder in which the ion exchange resin is contained. A conduit, often called a riser pipe, extends downwardly from the top of the tank. A filter screen, mounted at the end of the conduit prevents the entry of resin into the conduit. An opening is formed in the top of the tank for discharging or admitting fluid depending on the direction of flow.

In many applications, prior art water softeners such as the one described in the above referenced patent, performed satisfactorily. However, in some areas of the country "problem water" is encountered that contains bacteria which, although harmless, does effect the taste and/or odor of the water. The commonly encountered "rotten egg" odor is caused by a non-pathogenic anaerobic bacteria, such as Desulfuviuibrio Desulfuricaus, which is a sulfate reducing bacteria. Normally a food chain is established between the Desulfuviuibrio Desulfuricaus bacteria and an iron reducing bacteria. The reaction carried on by the sulfate reducing bacteria is exemplified by equation A:

$$SO_4^{-2} \rightarrow S^{-2} + 2O_2 \tag{A}$$

As can be seen from equation A, the reaction carried out by the sulfate reducing bacteria produces sulfide which when combined with hydrogen produces hydrogen sulfide, a gas having a "rotten egg" odor. The iron reducing bacteria produces carbohydrates which are utilized as food by both the sulfate reducing bacteria and the iron bacteria. The reaction involved is described by equation B:

$$CO_2 + 2H_2S \rightarrow (CH_2O)_n + H_2O + 2S \tag{B}$$

Both the sulfate and iron reducing bacteria utilize excess electrons to catalyze their reactions. The required excess electrons are generated by the oxidation reaction of ferrous iron to ferric iron according to equation C:

$$4Fe(HCO_3)_2 + 2H_2O + O_2 \rightarrow 4Fe(OH)_3 + 8CO_2 \tag{C}$$

Equation C can be simplified to Equation D:

$$Fe^{+2} \rightarrow Fe^{+3} + e^- \tag{D}$$

The simplified equation (equation D) shows the excess electrons produced when iron is oxidized. In short, the odor and the degradation in taste is produced by iron and sulfate reducing bacteria. Both types of bacteria depend on the oxidation of ferrous iron (present in the source water) to ferric iron. In order to carry out the oxidation of ferrous iron, free oxygen must also be available in the water.

It has been found that the use of a water softener may aggravate the problem. In a "two tank" type water softener in which one tank remains off-line in a stand-by condition while the other tank is being used, the idle tank can become a breeding ground for the bacteria. When the stand-by tank is placed on-line, it has been found that at least the initial water discharged by the tank may be of less than optimum quality.

DISCLOSURE OF THE INVENTION

The present invention provides a method and apparatus for treating problem water that inhibits the propagation of odor and taste degrading bacteria. The improvement is achieved without compromising the water treatment process performed by the water softening apparatus.

In the disclosed embodiment, the water softening apparatus comprises a pair of water softening tanks each containing water treatment resin. As is conventional, one tank is placed on-line and is placed in series with a source of water to be treated and the household water supply. The other tank is maintained off-line until the on-line tank is exhausted at which time the stand-by tank is placed on-line and the exhausted tank is placed off-line and regenerated.

Unlike prior water softeners such as the softener shown in U.S. Pat. No. 4,298,035, a final backwash of the tank being regenerated is delayed until the stand-by tank is about to be placed on-line. With the preferred process, the stand by tank is flushed with softened water from the on-line tank just prior to being placed in use and as a result bacteria in the tank is at least partially discharged.

Delaying the backwash also inhibits bacterial growth. It is believed that when the environment in which the bacteria is growing is changed from a "low solids" to a "high solids" state, the bacteria goes into a spore or non-active state and does not readily multiply. Water is considered to be in a "low solids" condition when the concentration of solids in the water is in the range of 1000 PPM (parts per million) and considered to be in a "high solids" condition when the concentration of solids exceeds 10,000 PPM. When a tank is on-line, it is in a "low solids" condition. During regeneration, it is placed in a "high solids" condition as the regeneration solution is passed through the tank. By postponing the backwash (which would place the tank in a low solids condition) the tank remains in a "high solids" condition and the bacteria tends to enter the non-active state.

The apparatus for providing the regeneration sequence is preferably a new fluid pressure operated servo-system which can be incorporated into the control valve of U.S. Pat. No. 3,891,552 or the improved control valve illustrated in U.S. Pat. No. 4,298,025.

The preferred embodiment of the invention retains the water usage and regeneration control turbines of the prior valve. As fully disclosed in the above referenced U.S. patents, the water usage turbine monitors the quantity of water treated by the ion exchange resin in a given tank. When a predetermined amount of treated water has been discharged by the tank, a regeneration cycle is initiated. During the regeneration cycle, the regeneration control turbine is operatively driven by a fluid stream that is activated when the regeneration cycle begins. The regeneration control turbine in turn drives a servo system that controls the regeneration process.

In the preferred embodiment, the servo system delays the final backwash of the tank being regenerated. In accordance with this embodiment, when a tank requires regeneration, the first step in the regeneration cycle is the final backwash of the tank about to be placed on line. After the backwash is completed, the exhausted tank is then taken off-line and regeneration of the exhausted tank begins.

In the preferred method, regeneration solution is drawn from a regeneration solution reservoir and is passed through the ion exchange bed. After a predetermined amount of regeneration solution has passed through the bed, a slow rinse commences in which the regeneration solution is gradually diluted and flushed from the bed. Prior to complete removal of the regeneration solution from the bed, the slow rinse is terminated, leaving diluted regeneration solution in the tank. This tank is then maintained off-line until the on-line tank requires regeneration. At the commencement of the regeneration cycle, the off-line tank is fully backwashed in order to flush all remaining regeneration solution from the ion exchange bed. The off-line tank is then placed in service.

With the disclosed apparatus and process steps, the odor and/or taste of problem water is improved. The final backwash not only flushes the ion exchange bed of stagnant water prior to placing the unit on line, but it is believed that it also inhibits bacterial growth. When regeneration solution is passing through the ion exchange bed, the tank is placed in a "high solids" condition. After the final backwash, the tank is normally in a "low solids" condition. It has been found that bacteria tends to become inactive when the tank is in a high solids state. Therefore, by delaying the final backwash, the high solids condition is maintained in the tank until just before being placed on line.

To further retard the propagation of bacteria in the standby tank, bacterial growth retardant or biocide is added to the regeneration solution. In the preferred and illustrated embodiment, the growth retardant comprises an oxygen reducing agent. According to the preferred embodiment, a predetermined quantity of the oxygen reducing agent is added to the solution reservoir as part of the regeneration cycle. Preferably, the agent is added automatically by a pumping arrangement which is responsive to a "brining" step in which "brine" solution is being aspirated into the control valve for delivery to the tank being regenerated. Specifically, the pump comprises a housing defining a pair of expansible chambers on either side of an elastomeric member captured within the housing. One expansible chamber communicates with a brine supply conduit whereas the other chamber communicates with a supply of the reducing agent. As regeneration solution is being drawn from the solution reservoir, the resulting reduced pressure in the brine supply conduit contracts the one chamber. The other chamber, which communicates with the oxygen reducing agent expands and draws the agent from the supply. At the conclusion of the "brining" step, the supply conduit is pressurized causing the one chamber to expand thus contracting the other chamber and expelling the accumulated fluid into a conduit that communicates with the regeneration solution reservoir. With the preferred apparatus, a predetermined quantity of the agent is added to the regeneration solution reservoir at the conclusion of the "brining" step so that a composite regeneration solution, including both brine and an oxygen reducer is produced for a subsequent regeneration cycle.

With the disclosed apparatus and method, problem water can be dealt with effectively and economically. Delaying the final backwash inhibits bacterial growth by causing the bacteria to enter a non-active state. The addition of the reducing agent to the regeneration solution further inhibits bacterial growth since it reduces the availability of oxygen which is necessary for the reaction that converts ferrous iron to ferric iron.

Additional features of the invention will become apparent and a fuller understanding obtained by reading the following detailed description made in connection with the accompanying drawings.

BEST MODE FOR CARRYING OUT THE INVENTION

Figure 1:
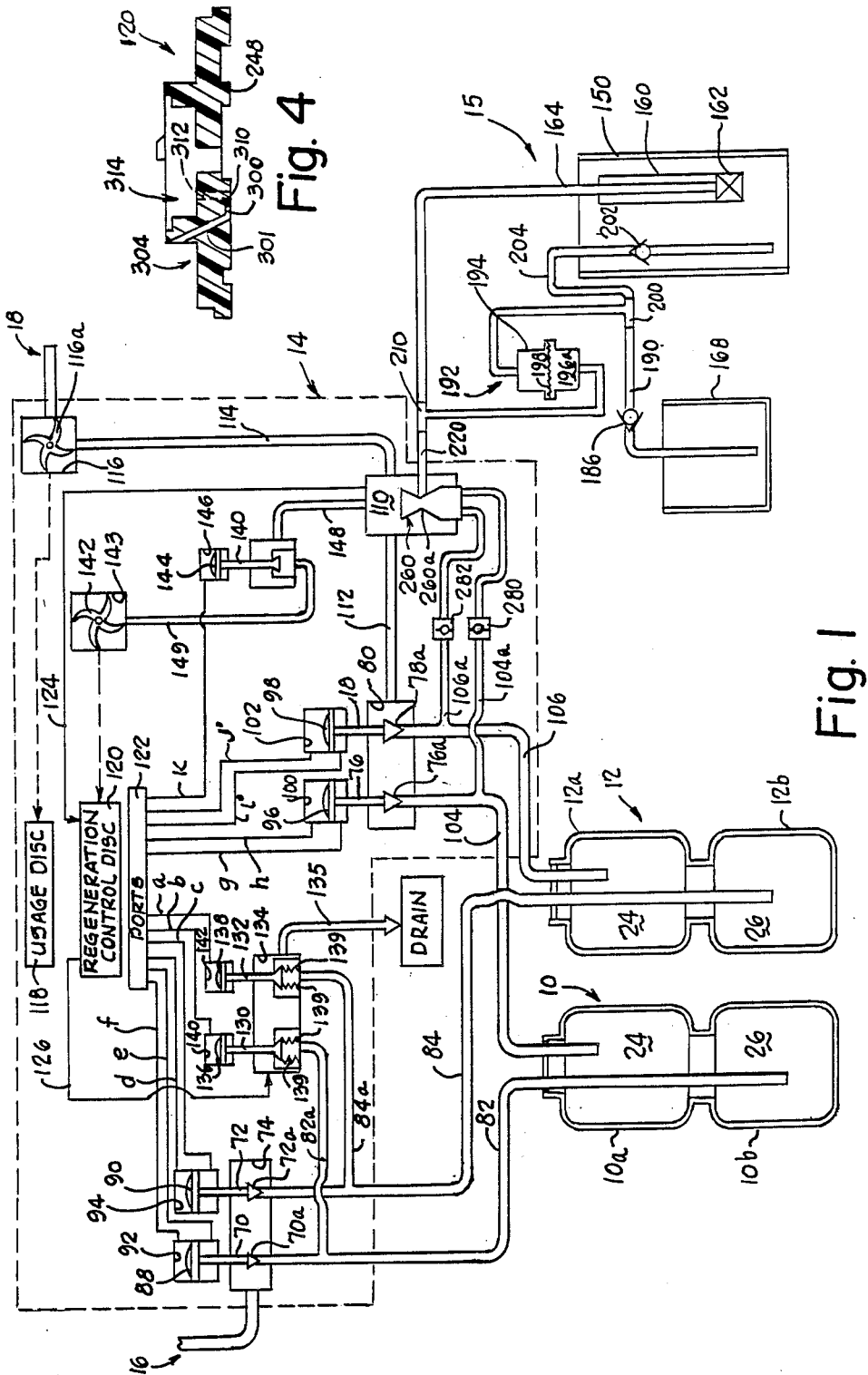
FIG. 1 is a schematic representation of a water softening system embodying the present invention.

FIG. 1 schematically illustrates a water treatment system constructed in accordance with the preferred embodiment of the invention. The system includes a pair of resin tank assemblies 10, 12 interconnected by a control valve module 14. In the preferred embodiment, the control valve module 14 is similar to the control valves described in U.S. Pat. Nos. 4,298,025 and 3,819,552 which are hereby incorporated by reference. A source of regeneration solution indicated generally by the reference character 15 is connected to the valve 14.

The control valve assembly 14 controls the communication of a source of water to be treated, indicated generally by the reference character 16 with the treatment tank assemblies 10, 12; the communication of the tanks with an outlet indicated by the reference character 18; and, the regeneration of an exhausted tank assembly.

In accordance with the preferred embodiment, each tank assembly 10, 12 includes a water softening resin bed and an iron filter bed 24, 26 respectively. In the preferred embodiment, the beds are housed in a pair of serially connected tanks 10a, 10b and 12a, 12b respectively.

The valve assembly 14 includes a plurality of water pressure operated valves, the opening and closing of which are controlled by a fluid signal control system. Whether the tanks 10, 12 are on-line or off-line is determined by a pair of inlet valves 70, 72 disposed in an inlet chamber 74 and a pair of outlet valves 76, 78 disposed in an outlet chamber 80. The inlet conduit 16 fluidly communicates with the inlet chamber 74. The inlet valves 70, 72 control the communication between the inlet chamber 74 and respective tank inlet passages 82, 84. Opening the valves 70, 72 allows feed water in the inlet conduit 16 to proceed into the tanks 10, 12, respectively.

The valves 70, 72 are operatively connected to a piston 88, 90 disposed in chambers 92, 94, respectively. The application of fluid pressures above the pistons apply valve closing forces to urge the valves 70, 72 into engagement with respective valve seats 70a, 72a. The application of fluid pressure to the underside of the pistons exerts valve opening forces.

The outlet valves 76, 78 are similarly configured and include pistons 96, 98 disposed in chambers 100, 102. The application of fluid pressure above and below the pistons 96, 98 applies valve closing and opening forces, respectively for moving the valves 76, 78 towards and away from associated valve seats 76a and 78a.

The valves 76, 78 control the communication between tank outlet passages 104, 106 of the tanks 10, 12, respectively with the outlet chamber 80. The outlet passages 104, 106 are connected to the top of the the tanks 10, 12. When either of the valves are open, water flow from the associated tank is allowed to proceed to a water collection chamber 110 by way of a passage 112. The collection chamber 110 communicates with the outlet conduit 18 through a fluid path that includes a passage 114 and an outlet chamber 116 that includes a rotatable turbine 116a. As fully described in U.S. Pat. Nos. 3,891,552 and 4,298,025, the turbine is mechanically coupled to a usage monitoring disk 118 which rotates as a function of the amount of water discharged through the outlet chamber 116 into the outlet conduit 18.

The monitoring disk 118 cooperates with a regeneration control disk 120. The control disk rotates atop an annular insert 122 that defines a plurality of ports each communicating with an associated signal line. Signal lines a-k are illustrated in FIG. 1. Each line extends from the port insert 122 to one of a plurality of piston chambers. The control disk 120 sealingly engages the top surface of the insert 122 and includes structural formations that operate to communicate the ports formed in the insert 122 with either water supply pressure (supplied by a passage 124) or ambient pressure (by communicating the ports with a drain passage 126). The ports and regeneration control disk 120 are arranged so that as the regeneration wheel rotates, the valves are sequentially operated in order to cycle an exhausted tank through a regeneration cycle.

In addition to the valve elements described above, the control valve assembly 14 also includes a pair of drain valves 130, 132 for controlling the communication of the tank inlet passages 82, 84, respectively, with a drain chamber 134 through respective branch passages 82a, 84a. The drain chamber 134 communicates with an ambient pressure drain through a drain conduit 135.

The drain valves 130, 132 are operated by pistons 136, 138 disposed in respective piston chambers 140, 142. In the preferred embodiment, the pistons are single acting and are driven to a valve open position by the application of fluid pressure to their top surfaces via signal lines a, b. Biasing springs 139 bias the valves towards their closed positions illustrated in FIG. 1 when the associated signal lines a, b are depressurized.

A regeneration control valve 140 controls the communication of water pressure from the water collection chamber 110 to a regeneration control turbine 142 located in a turbine chamber 143. The valve 140 includes a single acting piston 144 disposed in a chamber 146. The valve 140 is biased to its closed position by water pressure in the collection chamber 110 communicated through a passage 148. When the regeneration control valve 140 is opened (by the application of a fluid signal to the top surface of the piston by way of the signal line k) water pressure is allowed to proceed from the passage 148 to a passage 149 which includes a nozzle (not shown) for directing water against the turbine 142. The turbine 142 is mechanically coupled to the regeneration control disk 120 so that rotation of the turbine effects rotation of the control disk.

The application of fluid signals to the various piston chambers, as controlled by the relative movement of the regeneration control wheel with respect to the port insert 122, determines the sequence of valve actuation. The control disk 120 selectively communicates either water pressure from the collection chamber (fed to the disk by the pressure line 124) or the ambient drain pressure via the passage 126, to the various signal lines.

The regeneration components include a regeneration fluid aspirator 260 disposed in the collection chamber 110. The aspirator comprises a fluid flow regulating element (not shown) and a venturi 260a. The outlet of the venturi communicates with the tank outlet passages 104, 106 through branch passages 104a, 106a that include check valves 280, 282. The throat of the venturi communicates with the source of regeneration solution 15.

When either of the drain valves 130, 132 are opened, water in the collection chamber 110 is allowed to proceed through the venturi 260a and into the tank being regenerated. For example, suppose the drain valve 130 is opened. Water from the collection chamber will flow through the venturi 260a into the outlet passage 104 of the tank 10 (via passage 104a). The water will then travel through the tank assembly 10 in a counterflow direction and be ultimately discharged to the ambient drain by way of the inlet passage 82, the branch passage 82a and the drain chamber 134. As water passes through the venturi, regeneration fluid is drawn from the regeneration source 15 through a supply conduit 220 and mixed or "aspirated" with the venturi fluid. The regeneration fluid (now diluted with softened water) passes through the tank being regenerated. The effluent from the tank is discharged to drain via the drain chamber 134.

Figure 3:
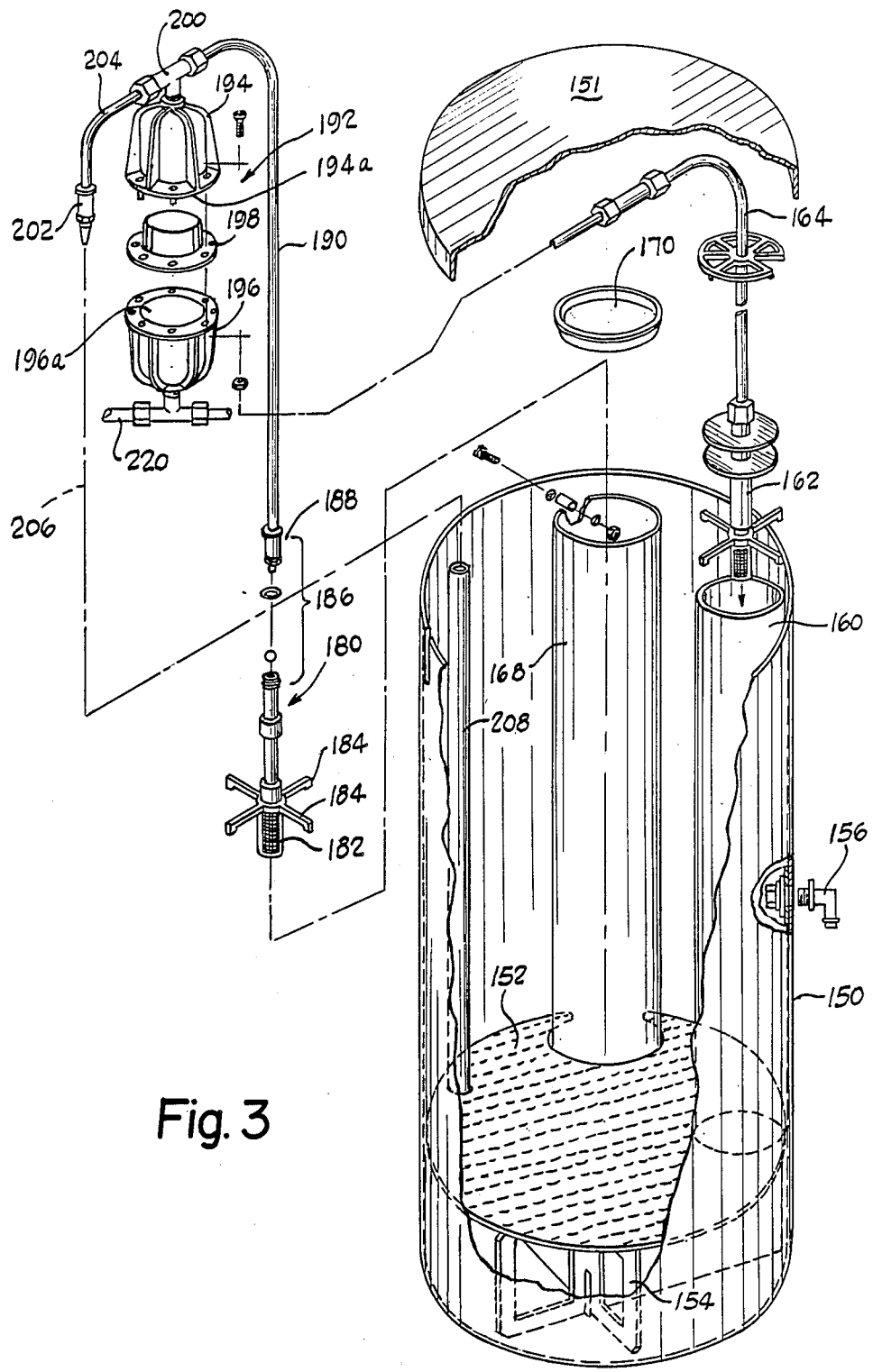
FIG. 3 is an exploded view of a brine tank and supplemental regeneration apparatus, constructed in accordance with the preferred embodiment of the invention; and, FIG. 4 is a sectional view of a regeneration control disk forming part of the present invention.

Turning also to FIG. 3, the source of regeneration solution 15 includes an open top tank 150 and a complemental tank lid 151. A screen or perforate plate 152 is supported above the bottom of the tank 150 by a support 154. As is known in the art, the perforate plate 152 supports a supply of salt (not shown) above the bottom of the reservoir. Water is added to the reservoir until a portion of the salt supply is submerged. The submerged salt then dissolves to form a brine solution. A fitting 156 is mounted in the side of the reservoir and forms an overflow to prevent an excess water level from developing in the reservoir.

A brine or regeneration solution well 160, formed by a tubular member mounted vertically along the wall of the reservoir, extends through the perforate plate and opens at or near the bottom of the reservoir. A brine valve 162 which may be the form shown in U.S. Pat. No. 4,336,134 is positioned at the lower end of the brine well and controls the flow of regeneration solution out of the reservoir 150 and the inflow of replacement water into the reservoir. The brine valve 162 is connected via a conduit 164 to the control valve apparatus 14. As explained above and shown in FIG. 1, the conduit 164 is connected (via conduit 220) to a venturi mechanism in the control valve 14 which becomes operative to cause the aspiration of regeneration solution during a regeneration cycle.

As also seen in FIG. 3, a regenerant sump 168 for a supplemental regenerant fluid is also located in the reservoir 150. Although it is located in the reservoir 150, unlike the brine sump 160, the regenerant sump 168 is isolated from the reservoir and is not in fluid communication with the regeneration solution. The regeneration sump forms an isolated reservoir of a separate regeneration fluid. A cap 170 normally covers the top of the regenerant sump to inhibit contamination by foreign material.

In the preferred embodiment, a predetermined amount of the supplemental regenerant fluid is drawn from the regenerant sump 168 during a regeneration cycle and is injected into the brine or regeneration solution at or near the conclusion of the regeneration cycle. The apparatus for achieving this feature includes an inlet assembly 180 which includes a filtering screen 182 mounted below a set of radially extending arms 184 which serve to locate the filter near the center of the regenerant sump 168. The assembly 180 also includes a ball check valve 186 and associated fitting 188. The assembly is disposed at or near the bottom of the regeneration sump.

A conduit 190 extends upwardly and is connected to a pumping assembly 192. In particular, the pump assembly 192 includes upper and lower housing members 194, 196 and an elastomeric diaphragm 198 positioned and sealingly clamped between the two housing members. The diaphragm divides the pump into upper and lower chambers 194a, 196a. The orientation shown in FIGS. 1 and 3 enables the pump assembly 192 to be disposed inside the tank 150 and enclosed by the tank cover 151.

The conduit 190 is connected to the upper chamber 194 by a T-fitting 200. The T-fitting 200 is also connected to a check valve 202 by a conduit 204. In the disclosed embodiment the check valve 202 is of the "duck bill" variety. However it should be noted that a ball-type check valve or other check valve can also be used. As indicated by the dot-dash line 206 in FIG. 3, the check valve 202 is connected to a vertically extending tube 208, mounted in the regeneration solution reservoir 150. The tube 208 extends into the brine reservoir and is in communication with the brine or regeneration solution.

In operation, the check valve 186 located in the inlet assembly 180 allows regenerant fluid flow from the regenerant sump 168 into the upper chamber 194a of the pumping assembly 192. When the supplemental regenerant fluid is expelled by the upper chamber 194a (upon pressurization of the lower chamber 196a), the ball check valve 186 closes to prevent return flow. The check valve 202 opens to allow the expelled fluid to be injected into the inlet tube 208.

The brine conduit 164 is connected to the lower chamber 196a by a T-fitting 210. The T-fitting 210 is connected to the control valve assembly 14 by the brine supply conduit 220

During a regeneration cycle, as for example when the tank assembly 12 is being regenerated, softened water is communicated to the venturi 260a. The flow of water through the venturi draws regeneration solution from the brine well 160 through the conduits 164, 220. When a predetermined amount of the regeneration solution is drawn from the reservoir 150, the brine valve 162 closes. The continued flow of softened water through the venturi 260 develops a suction pressure which causes the diaphragm 198 to move downwardly (as viewed in FIG. 3) and contract the lower chamber 196a. The attendant expansion of the upper chamber 194a causes supplemental regeneration fluid in the regeneration sump 168 to be drawn into the upper chamber 194a through the conduit 190 and check valve 186. The amount of solution drawn corresponds to the change in volume of the upper chamber 194a. The check valve 202 prevents air from being drawn into the conduit 204.

Softened water from the collection chamber 110 continues to flow into the tank 12 by way of the branch passage 104a and the fluid aspirator 260. This softened water dilutes the regeneration solution in the tank assembly 12.

After a predetermined amount of time, the flow of softened water into the tank 12 is terminated by depressurizing the drain piston chamber 142. The biasing springs 139 close the drain valve 132. With the drain valve closed, the water in the collection chamber 110 flows into and pressurizes the aspirator supply conduit 164. The flow of softened water into the conduit 164 replenishes the water in the brine tank 150. The brine control valve 162 controls the quantity of water admitted into the tank.

In addition, the pressurization of the conduit 164 expands the lower chamber 196a of the pumping assembly 192 causing the contraction of the upper chamber 194a and the expulsion of the accumulated supplemental regenerant fluid into the conduit 190. The check valve 186 prevents return flow of the regenerant fluid into the regenerant supply sump 168. The expelled fluid is thus discharged into the regeneration solution reservoir 150 by way of the conduit 204 and check valve 202. With the disclosed apparatus, a composite regeneration solution consisting of brine and a supplemental regenerant fluid, is automatically created.

In the preferred embodiment, the supplemental fluid includes an oxygen reducing agent which, as described above, reduces the available oxygen in the water thereby making the oxygen unavailable for the ferrous to ferric iron reaction. As indicated above, this iron reaction frees electrons which are then used to catalyze the reaction of the iron reducing and sulfate reducing bacteria. By reducing the amount of free electrons, the propagation of the iron reducing and sulfate reducing bacteria is inhibited. Moreover, other bacteria growth retardants or biocides may be substituted for, or combined with, the oxygen reducing agent.

It should be noted here that the supplemental regenerant fluid may be a mixture of constituents. For example, in addition to the oxygen reducing agent, the supplemental fluid may also include a chemical for enhancing the regeneration of the resin bed as described in copending application Ser. No. 646,953, now U.S. Pat. No. 4,693,814. In the preferred embodiment, the flow of softened water or slow rinse of the tank being regenerated is terminated prior to complete removal of the regeneration solution. Moreover, the final backwash is postponed until the regenerated tank is about to be placed on line. With the preferred apparatus and method, the diluted regeneration solution (which contains the oxygen reducing agent or biocide) left in the partially regenerated tank inhibits growth of the iron reducing and sulfate reducing bacteria.

Figure 2:
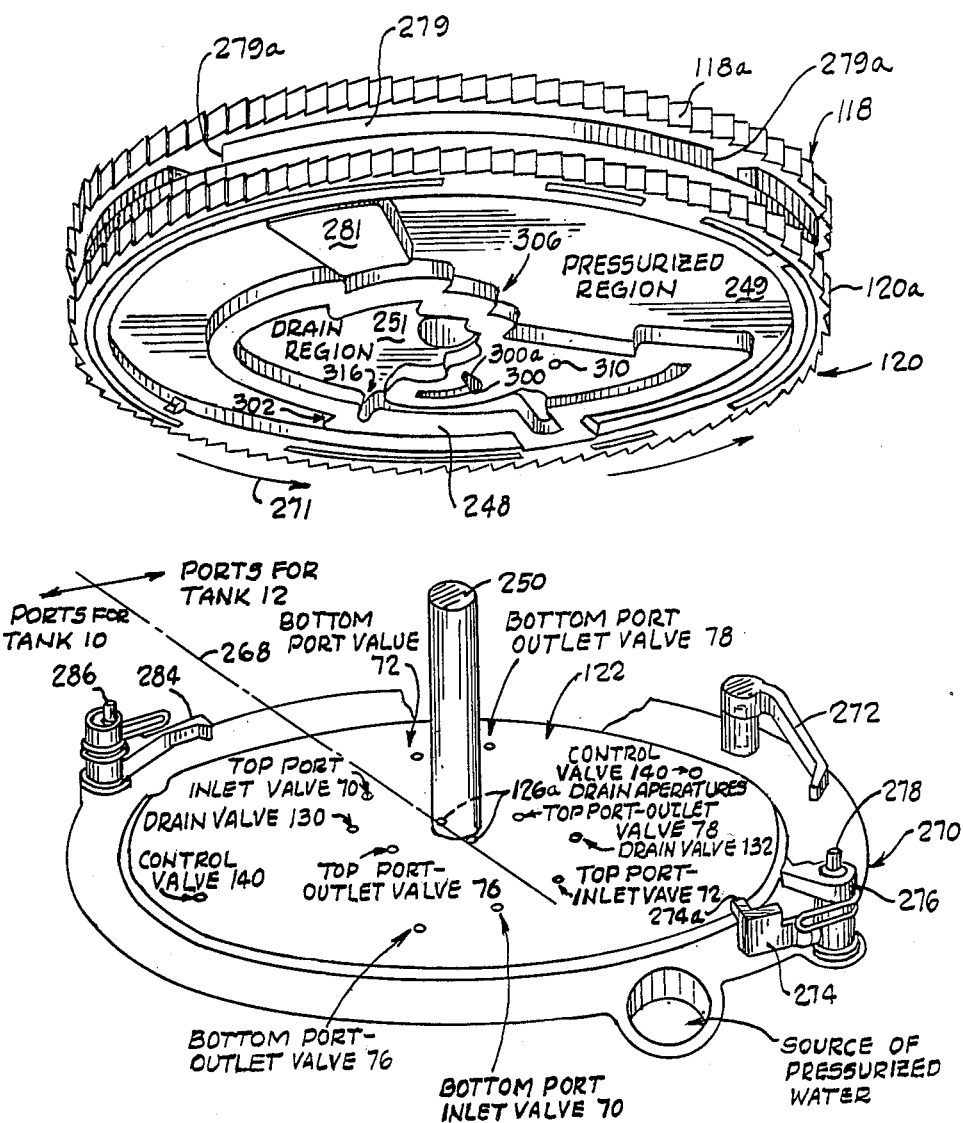
FIG. 2 is a perspective view of a regeneration control disk and associated port insert, forming part of the present invention.

The sequence of regeneration steps as well as the frequency of regeneration is controlled by the regeneration control disk 120 and the usage disk 118, respectively. Referring to FIGS. 1 and 2, the regeneration control disk 120 sealingly engages and rotates atop the circular port-defining insert 122. The ports defined by the insert 122 communicate with the various piston chambers. The underside of the regeneration control disk 120 includes a depending wall 248 that divides the underside of the disk 120 into pressurized and drain regions 249, 251. The port insert 122 includes a pair of drain apertures 126a located on either side of an upwardly extending stub shaft 250 about which both the regeneration control disk 120 and the water usage disk 118 rotate. The drain apertures 126a communicate with the drain chamber 134 through the passage 126 (shown in FIG. 1) which is integrally formed in the valve body. Thus, the drain region of the regeneration control disk is maintained at the ambient drain pressure.

Two sets of ports are provided in the insert 122 and are located symmetrically about an imaginary diametral line 268. The ports to the left of the line 268 control the regeneration sequence for the tank 10 whereas the ports to the right of the line 268 control the regeneration sequence for the tank 12. During a regeneration cycle, the control disk 120 rotates 180° to effect the complete regeneration cycle of one of the tanks. The location of the ports and their function, as shown in FIG. 2 correspond to the ports shown and described in U.S. Pat. Nos. 3,891,552 and 4,298,025. As fully explained in these earlier patents, the depending wall 248 controls the communication of pressurized water from the pressurized region 249 to the ports or communicates the ports with the drain region 251 to depressurize the respective chambers. The ports and their function are labeled in FIG. 2 and indicate which valves they are associated with. The inlet and outlet valves 70, 72, 76 and 78 each include "top" and "bottom" ports. The "top ports" communicate with the top of the associated operating pistons 88, 90, 96, 98 and the pressurization of these ports apply a valve closing force. Conversely, the "bottom ports" communicate with the underside of the pistons and apply valve opening forces when pressurized.

Usage disk 118 and the regeneration control disk 120 are preferably rotated by a drive mechanism fully disclosed in U.S. Pat. No. 4,298,025. Referring to both FIGS. 1 and 2, the disks 118, 120 are driven by a ratcheting mechanism that includes a plurality of pawls. As seen best in FIG. 2, the usage disk 118 rotates atop and concentrically with the regeneration control disk 120. The disks 118, 120 each include peripheral ratchet teeth 118a, 120a respectively. The water usage disk 118 is rotated by a pawl arrangement indicated generally by the reference character 270. Both discs rotate in the direction indicated by the arrow 271; an anti-reverse pawl 272 prevents reverse rotation of the disk 118.

The pawl arrangement 270 includes a pair of individual, spring biased pawls 274, 276, concentrically journalled on an eccentric shaft 278. The shaft 278 is coupled to the water usage turbine 118a through a reduction gear train (not shown). In operation, the usage turbine 116a shown in FIG. 1, and hence the water usage disk 118 rotates in proportion to the amount of treated water discharged by the valve assembly 14.

The usage disk 118 also includes an axially depending flange 279 that is interrupted by a plurality of circumferentially spaced slots 279a.

The number and position of the slots 279a determine the frequency of regeneration. The lower pawl 274 of the ratchet mechanism 270 includes a prong 274a that extends into sliding engagement with the flange 279. The prong 274a is sized so that when in engagement with the flange, the pawl 274 is maintained out of engagement with the regeneration control disk 120. When the prong 274a enters one of the slots 279a, the pawl 274 engages the ratchet teeth 120a of the regeneration control disk 120 so that rotation of the eccentric shaft 278 causes concurrent rotation in the disks 118, 120. The initial rotation of the regeneration control disk 120 by the lower pawl 274 causes one of the control valve ports in the port insert 122 to be pressurized by virtue of being uncovered by a depending surface 281, thus initiating regeneration.

When the control valve 140 (shown in FIG. 1) is open, a fluid stream is directed to the regeneration turbine 142 (shown in FIG. 1) located in the turbine chamber 143. The turbine 142 is mechanically coupled to a regeneration drive pawl 284 through a reduction gear train. The pawl is journaled on an eccentric shaft 286. Rotation of the turbine 142 thus effects incremental rotation of the regeneration control disk 120 and in so doing, effects a regeneration cycle. The regeneration cycle continues until the control port communcating with the control valve chamber 146 via signal line K (shown in FIG. 3) is depressurized thus closing the control valve 140.

Referring in particular to FIGS. 1 and 2, the process steps will now be discussed in greater detail. As indicated above, a regeneration cycle is initiated when the depending surface 281 uncovers one of the ports communicating with the control valve 140. As seen in FIG. 2, two control valve ports, separated by 180°, are defined in the insert 122. It should be apparent, the regeneration control disk 120 rotates through an arc of 180° during a regeneration cycle. For purposes of explanation, suppose that tank 10 requires regeneration. As indicated in FIG. 2, the ports, defined in the insert 122, to the left of the diametral line 268, control the regeneration of tank 10. Movement of the regeneration control disk 120 is initiated by the pawl assembly 270 as explained above. The initial movement in the disk 120 by the pawl 270 causes the depending surface 281 to uncover the control valve 140.

In the disclosed embodiment, a full backwash of the standby tank is completed prior to taking the exhausted tank off-line and regenerating it. To achieve this feature, portions of the depending wall 248 are "shifted" as compared to the structure and structural location shown in U.S. Pat. No. 4,298,025 so that, in effect, the regeneration steps for regenerating the exhausted tank are delayed until the standby tank is backwashed. In addition, provision has been made in the depending wall to open and close the drain valve associated with the standby tank at the start of regeneration.

Specifically, the depending 248 includes a cavity or recess 300 that communicates with the source of pressurized water. Referring also to FIG. 4, the communication is provided by a passage 301 formed (as by drilling) in the control disk 120 that extends from the recess 300 to the top surface of the disk 120 and opens into a region indicated generally by the reference character 304 defined between the bottom of the usage disk 118 and the top of the central disk 120. This region is normally exposed to the pressurized water as described in U.S. Pat. Nos. 3,891,552 and 4,427,549 which are hereby incorporated by reference.

The recess 300 is aligned with the drain aperture 126a so that, as the regeneration cycle is initiated by movement in the regeneration control disk 120, the drain port of the standby tank (in this case tank 12) is pressurized thus opening the drain valve 132. Substantially concurrently with the opening of the drain valve 132, a portion of the depending wall 248 indicated generally by the reference character 302 uncovers the bottom port for the outlet valve 78 thus pressurizing the control line i and opening the outlet valve 78 to communicate the outlet chamber 80 with the conduit 106. Since the drain valve 132 is opened, softened water flows from the outlet chamber 80 through the standby tank 12 and out the drain conduit 135 thus effecting a final backwash of the standby tank 12. After a predetermined movement in the disk 120, the port for the drain valve 132 is closed terminating the source of pressure and allowing the return springs 139 to close the drain valve. Further movement in the disk 120 depressurizes the bottom port and associated control line g of the outlet valve 76 while pressurizing the top port and associated control line h. Substantially concurrently with this action, the top port of the inlet valve 70 and associated control line f are pressurized while the bottom port and associated control line e are depressurized, closing the inlet valve 70 and taking the tank 10 off-line. The various control ports and associated control lines communicating with the control elements of the tank 10 are then sequentially pressurized and depressurized by the stepped structure, indicated generally by the reference character 306 of the depending wall 248 in order to sequence the tank 10 through a partial regeneration cycle.

As discussed above, the final backwash is delayed until the standby tank is about to be placed on line. As seen in FIG. 2, regeneration is terminated when the ports for the control valve 140 are covered. When the disk 120 reaches the cycle termination position, an aperture 310 formed in the depending wall 248, is aligned with the aperture for the drain valve port 126a of the tank being regenerated. The aperture 310 communicates with the drain region and thus depressurizes the associated drain valve through its associated control line. The return springs 139 then operate to close the opened drain valve.

The aperture 310 is communicated with the ambient drain through a passage 312 formed (as by drilling) in the control disk that extends from the aperture 310 to a central top region 314 on the control disk that communicates with the drain. An example of such a drilled passage is shown in U.S. Pat. No. 4,427,549.

Additional structure has been provided to insure that the standby tank remains isolated from the on-line tank after it has been partially regenerated. As seen in FIG. 2, the recess 300 includes an extension 300a. In addition, the depending wall 248 jogs outwardly at a position indicated generally by the reference character 316. The regions 300a and 316 are concurrently alignable with bottom and top ports respectively, of an outlet valve when the disk 120 is in a predetermined position. These two regions become co-aligned with the respective bottom and top ports of an outlet valve when the partial regeneration is complete. The region 316 depressurizes the underside of the associated outlet valve whereas the region 300a pressurizes the top of the outlet piston thus insuring that the associated outlet valve is driven and maintained in its closed position.

With the disclosed and illustrated water softening apparatus and method, problem water can be dealt with efficiently and effectively. The regeneration cycle, as controlled by the servo system forming part of the control valve 14, partially regenerates an exhausted tank and delays the final backwash so that a diluted solution of regeneration fluid is left in the standby tank. By maintaining a "high solids" condition in the standby tank, bacterial propagation is inhibited. By delaying the final backwash until the standby tank is about to be placed on line, the diluted solution, and at least some of the bacteria, is flushed from the tank prior to being placed in service.

The propagation of bacteria is further inhibited by the apparatus and method of automatically injecting a supplemental regenerant fluid, preferably including a bacteria growth retardant or an oxygen reducing agent into the brine reservoir so that a composite regeneration fluid is created that not only provides the chemistry for effecting regeneration of the water softening resin but also reduces the oxygen level in the water to reduce or inhibit the reaction of ferrous iron to ferric iron. By reducing the available oxygen, free electrons that are normally used to catalyze the reactions of the iron reducing and sulfate reducing bacteria are reduced.

Although the invention has been described with a certain degree of particularity, it should be understood that those skilled in the art can make various changes to it without departing from the spirit or scope of the invention as hereinafter claimed.

We claim:

1. In a water softening system including a pair of treatment tanks and a control valve for controlling which of the tanks is on-line and which of the tanks is off-line, the improvement comprising:
(a) control means including partial regenerating means for partially regenerating said off-line tank, said partial regenerating means including valve means for terminating fluid flow through said off-line tank whereby a dilute regeneration solution is left in said off-line tank such that said off-line tank is left in a high solids condition;
(b) backwash delay means operative to backwash said off-line tank just before said off-line tank is to be placed in service by said control means such that said off-line tank is placed in a low solids condition.

2. A method for treating problem water, comprising the steps of:
(a) providing a pair of treatment tanks, each tank defining a resin compartment containing treatment material;
(b) providing a control valve means for controlling which of the treatment tanks is on-line and which of the tanks is off-line;
(c) passing water through an on-line treatment tank;
(d) providing a reservoir of regeneration solution and a regeneration control means for regenerating an off-line tank using solution drawn from said reservoir;
(e) adding a bacteria retarding agent to said reservoir of regeneration solution at predetermined intervals by an injection means that includes a pump operated by sensed changes in pressure in a regeneration fluid supply line.

3. A method of treating problem water, comprising the steps of:
(a) providing a pair of treatment tanks, each tank defining a resin compartment containing water treatment materials;
(b) providing a control unit for controlling which of said pair of treatment tanks is on-line and which of said tanks is off-line;
(c) passing water through an on-line treatment tank;
(d) providing a reservoir of regeneration solution for regenerating the off-line tank;
(e) partially regenerating an off-line tank by:
   (i) conveying regeneration solution from said reservoir to said tank and passing said solution through said resin compartment;
   (ii) terminating said flow of regeneration solution from said reservoir and passing water through said resin compartment to slowly rinse said resin compartment of said regeneration solution;
   (iii) terminating said flow of water prior to completely flushing said resin compartment of said regeneration solution whereby a diluted regeneration solution is left in said resin compartment;
(f) sensing when the on-line tank is about to be taken off-line and prior to taking said on-line tank off-line, backwashing said partially regenerated off-line tank to substantially flush said resin compartment of said diluted regeneration solution prior to placing said regenerated tank on-line.

4. The method of claim 3 further comprising the step of adding an oxygen reducing agent to said regeneration solution reservoir after said flow of regeneration solution to said off-line tank is terminated.

5. A water treatment apparatus, comprising:
(a) a pair of water treatment tanks each defining a fluid flow path including a resin compartment through which water to be treated is passed;
(b) control means for controlling which of said tanks is on-line and which of said tanks is off-line;
(c) monitoring means for determining when an on-line tank requires regeneration;
(d) regeneration control means including valve means for communicating regeneration solution to said off-line tank and further including means for slowly rinsing said off-line tank with water including means for terminating the flow of water to leave a diluted regeneration solution in said off-line tank;
(e) backwash control means operative to determine when an on-line tank is about to be taken off-line and operative to fully backwash the off-line tank to flush said diluted regeneration solution from the off-line tank just prior to placing said off-line tank on-line.

6. The apparatus of claim 5 further comprising supplemental control means operative to add a bacteria retarding agent to the regeneration solution reservoir prior to regenerating the off-line tank.

7. The apparatus of claim 6 wherein said retarding agent comprises an oxygen reducing agent.

8. A method for treating a fluid, comprising the steps of:
(a) providing a pair of treatment tanks, each tank defining a fluid flow path including a resin compartment containing treatment materials for treating fluid conveyed along said flow path;
(b) passing fluid through an on-line treatment tank;
(c) monitoring the quantity of fluid treated by said on-line tank;
(d) partially regenerating an off-line tank by:
   (i) communicating regeneration solution from a solution reservoir to said off-line tank and conveying said solution along said fluid path;
   (ii) terminating said flow of regeneration solution from said solution reservoir to said tank while continuing a flow of said fluid through said resin compartment to slowly rinse said compartment of regeneration solution;
   (iii) terminating said flow of fluid through said treatment material whereby a diluted regeneration solution is left in said tank;
(d) maintaining said partially regenerated tank off-line and isolated from said on-line tank;
(e) sensing when said on-line tank requires regeneration and prior to taking said on-line tank off-line, fully backwashing said off-line to substantially completely flush diluted regeneration solution from the treatment material in said off-line tank prior to placing said off-line tank on-line.

9. Apparatus for treating water, comprising:
(a) a pair of treatment tanks, each tank defining a compartment containing water treatment material and further defining a flow path through said treatment material extending between a tank inlet and a tank outlet;
(b) control valve means for controlling the communication of a source of water to be treated with said tanks and for controlling the fluid communication of said tanks with an output conduit;
(c) said control valve means including an inlet chamber including inlet valves associated with each tank each inlet valve movable between an open position at which said source is communicated with the associated tank inlet and a closed position at which said associated tank inlet is isolated from said source;

(d) said control valve means including an outlet chamber including outlet valves associated with each tank, each outlet valve movable between an open position at which an associated tank outlet is communicated with said output conduit and a closed position at which said associated tank outlet is isolated from said output conduit;

(e) said inlet and outlet valves driven between opened and closed positions by a fluid operated servo-system forming part of said control valve means;

(f) drain valves associated with each tank, and movable from a flow interrupting position to a drain position at which an associated tank is communicated with an ambient drain, said drain valves movable to said open position by said servo-system and being resiliently biased towards a closed position by a resilient biasing means;

(g) a fluid aspirator including a venturi communicating with a vessel of regeneration solution such that when said aspirator is activated, water is conveyed through said venturi causing regeneration solution to be drawn from said regeneration solution vessel;

(h) means communicating said aspirator with a tank being regenerated including means for opening the one drain valve associated with said tank being regenerated, to allow said regeneration solution to be discharged to an ambient drain after passing through the tank;

(i) said servo-system including means for terminating an opening force on said one drain valve such that said one drain valve is closed by the resilient biasing means to terminate the fluid flow through said tank being regenerated leaving said tank in a partially regenerated state;

(j) said servo-system further including means for sensing that said partially regenerated tank is about to be placed on-line and operative to apply an opening force on the one drain valve, said force sufficient to overcome said biasing force whereby said drain valve is opened, said sensing means being further operative to substantially concurrently open an outlet valve associated with said partially regenerated tank whereby treated water in said outlet chamber is allowed to proceed through said partially regenerated tank and to said ambient drain such that said partially regenerated tank is fully backwashed with treated water prior to being placed on-line.

10. The apparatus of claim 9 wherein said servo-system includes a water monitoring disk and a regeneration control disk, said water monitoring disk operative to control the frequency of regeneration of said tanks and said regeneration control disk operative to control the application of fluid forces to said inlet valves, outlet valves and drain valves to effect control of a regeneration cycle, said control disk including structure for communicating a pressurized fluid or an ambient drain pressure with fluid passages associated with operating members of said inlet valves, outlet valves and drain valves.

11. The apparatus of claim 9 further including:
(a) a reservoir of an oxygen reducing agent;
(b) a pumping means responsive to fluid pressures in a supply line connected with said venturi;
(c) said pumping means operative to draw and accumulate a predetermined quantity of said reducing agent from said reservoir and being further operative to discharge said accumulated reducing agent into the regeneration solution vessel prior to regenerating an exhausted tank.

12. In a water softening system including a pair of water treatment tanks, one of said tanks being on-line while said other tank is kept off-line until the on-line tank requires regeneration, a method for regenerating an off-line tank, comprising the steps of:
(a) partially regenerating said off-line tank by:
(i) communicating a source of regeneration solution to an outlet of said off-line tank and conveying said regeneration solution through treatment material contained in said off-line tank and discharging said regeneration solution to an ambient drain;
(ii) terminating the flow of regeneration solution from said regeneration solution source after a predetermined quantity of regeneration solution has passed through said treatment material;
(iii) slowly rinsing said off-line tank by conveying water treated by said on-line tank through said treatment material and discharging said water to said ambient drain after passing through said off-line tank;
(iv) terminating the flow of said treated water through said off-line tank prior to fully rinsing regeneration solution from said tank;
(b) maintaining said partially regenerated tank off-line and isolated from said on-line tank;
(c) sensing when said off-line tank is to be placed on-line and communicating the outlet of said off-line tank with water treated by said on-line tank and allowing said treated water to pass through said treatment material at a flow rate higher than the flow rate of fluid during the slow rinse step and discharging said water to said ambient drain such that said off-line tank is substantially completely flushed of regeneration solution prior to being placed on-line.

13. The method of claim 12 further comprising the step of adding a predetermined quantity of a supplemental regenerant fluid containing a bacteria growth retarding agent to said regeneration solution source after the flow of regeneration solution is terminated to said outlet of said off-line tank.

* * * * *